(12) United States Patent
Tian et al.

(10) Patent No.: US 9,717,122 B2
(45) Date of Patent: Jul. 25, 2017

(54) DIMMING CIRCUIT AND DIMMING SYSTEM SUITABLE FOR SCR DIMMER CIRCUIT

(71) Applicant: SENGLED OPTOELECTRONICS CO., LTD., Tongxiang (CN)

(72) Inventors: Zhibin Tian, Tongxiang (CN); Junshan Lou, Tongxiang (CN); Chaoqun Sun, Tongxiang (CN); Jinxiang Shen, Tongxiang (CN)

(73) Assignee: SENGLED OPTOELECTRONICS CO., LTD, Tongxiang (CN)

( * ) Notice: Subject to any disclaimer, the term of this patent is extended or adjusted under 35 U.S.C. 154(b) by 0 days.

(21) Appl. No.: 15/108,843

(22) PCT Filed: Dec. 29, 2015

(86) PCT No.: PCT/CN2015/099584
§ 371 (c)(1),
(2) Date: Jun. 29, 2016

(87) PCT Pub. No.: WO2016/107566
PCT Pub. Date: Jul. 7, 2016

(65) Prior Publication Data
US 2016/0366735 A1    Dec. 15, 2016

(30) Foreign Application Priority Data

Dec. 31, 2014  (CN) .......................... 2014-10854807

(51) Int. Cl.
*G05F 1/00* (2006.01)
*H05B 37/02* (2006.01)
(Continued)

(52) U.S. Cl.
CPC ...... *H05B 33/0815* (2013.01); *H02M 1/4208* (2013.01); *H02M 7/155* (2013.01);
(Continued)

(58) Field of Classification Search
None
See application file for complete search history.

(56) References Cited

U.S. PATENT DOCUMENTS

| | | | |
|---|---|---|---|
| 2011/0260634 A1 | 10/2011 | Zhang | |
| 2011/0279044 A1* | 11/2011 | Maiw | H05B 33/0809 315/186 |

(Continued)

FOREIGN PATENT DOCUMENTS

| | | |
|---|---|---|
| CN | 101841242 A | 9/2010 |
| CN | 201869417 U | 6/2011 |
| CN | 104540292 A | 4/2015 |

OTHER PUBLICATIONS

The World Intellectual Property Organization (WIPO) International Search Report for PCT/CN2015/099584 Mar. 30, 2016.

*Primary Examiner* — Anh Tran
(74) *Attorney, Agent, or Firm* — Anova Law Group, PLLC

(57) ABSTRACT

The present disclosure provides a dimming circuit for SCR dimmer (silicon-controlled rectifier) circuit. The dimming circuit includes a signal conversion circuit for converting an input signal to a sine-wave voltage signal and output the sine-wave voltage signal to a current sampling end of a power factor correction circuit. The dimming circuit also includes the power factor correction circuit to receive the sine-wave voltage signal for correcting power factor. A biasing current is generated according to the input signal and is positively correlated to the input signal, and a sine-wave current signal corresponding to the sine-wave voltage signal is a sum of the biasing current and a primary current of a transformer in the power factor correction circuit.

11 Claims, 2 Drawing Sheets

(51) Int. Cl.
*H05B 39/04* (2006.01)
*H05B 41/36* (2006.01)
*H05B 33/08* (2006.01)
*H02M 1/42* (2007.01)
*H02M 7/155* (2006.01)

(52) U.S. Cl.
CPC ..... *H05B 33/0809* (2013.01); *H05B 33/0845* (2013.01); *H02M 2001/4283* (2013.01)

(56) References Cited

U.S. PATENT DOCUMENTS

2014/0062322 A1   3/2014   Yu et al.
2014/0239830 A1*  8/2014   Kiyota ............... H05B 33/0815
                                              315/200 R

* cited by examiner

DIMMING CIRCUIT AND DIMMING SYSTEM SUITABLE FOR SCR DIMMER CIRCUIT

CROSS-REFERENCES TO RELATED APPLICATIONS

This PCT patent application is a national phase entry under 35 U.S.C. §371 of International Application No. PCT/CN2015/099584, filed on Dec. 29, 2015, which claims the priority of Chinese Patent Application No. CN201410854807.1, filed on Dec. 31, 2014, the entire contents of which are incorporated herein by reference.

FIELD OF THE DISCLOSURE

The present disclosure generally relates to the field of light emitting diode (LED) technologies and, more particularly, relates to a dimming circuit and dimming system suitable for a silicon-controlled rectifier (SCR) type dimmer.

BACKGROUND

An LED (i.e., light emitting diode) is a semiconductor device capable of converting electric energy to visible light. An LED can directly convert electricity to light. LED lighting can provide advantages including energy conservation, environmental protection, controllable lighting, strong practicability, high stability, short response time, and long operation lifetime. LED lighting has been widely used in various lighting areas for low-carbon lifestyle.

Current LED dimming technology is often based on a SCR type dimmer (also referred to as a SCR dimmer). In current LED dimming technology, the output of a SCR dimmer may be connected to a rectifier circuit and the output of the rectifier circuit may be connected to the bus line voltage. One terminal of a primary side of the transformer may be connected to the bus line voltage, and the other terminal may be connected to the CS (i.e., current sampling) pin of an IC (i.e., integrated circuit) such that a DC voltage signal may be used as an input to the CS end of the IC. The IC may be used to correct the primary power factor of the transformer. By adjusting or changing the value of the DC voltage signal, the IC may change the peak value of the primary current of the transformer connected to the IC. Thus, the SCR dimmer can change/dim the light of the LED.

However, when the value of the bus line voltage is at wave trough (e.g., bottom or minimum value), the value of the switch-off threshold may become considerably small, which is because the value of the switch-off threshold in the power factor correction circuit is proportional to the value of the bus line voltage, the value of the switch-off threshold may be close to zero when the value of the bus line voltage is close to zero. When the value of the switch-off threshold is close to zero, the voltage offset value on the current sampling (CS) end of the IC may often be greater than the value of the switch-off threshold. As a result, the IC may stop functioning, and the transition between the latching current to the holding current of the SCR dimmer may not be continuous current. The SCR dimmer may be shut off unexpectedly, and the LED may have undesired flashing/strobing light.

BRIEF SUMMARY OF THE DISCLOSURE

The disclosed dimming circuits and dimming systems are directed to solve one or more problems set forth above and other problems.

One aspect or embodiment of the present disclosure provides a dimming circuit for a SCR (silicon-controlled rectifier) dimmer. The dimming circuit includes a signal conversion circuit and a power factor correction circuit. The signal conversion circuit is configured to convert an input signal into a sine-wave voltage signal and to output the sine-wave voltage signal to a current sampling end of the power factor correction circuit. The power factor correction circuit is configured to receive the sine-wave voltage signal for correcting a power factor. A biasing current is controllably generated according to the input signal and is positively correlated to a value of the input signal. A sine-wave current signal corresponding to the sine-wave voltage signal is a sum of the biasing current and a primary current of a transformer in the power factor correction circuit.

Optionally, the signal conversion circuit includes a first transistor. A base of the first transistor is connected to the input signal through a first resistor (R3) and the base of the first transistor is grounded through a second resistor (R4). An emitter of the first transistor is grounded through a third resistor (R5). A collector of the first transistor is connected to the current sampling end of the power factor correction circuit through a fourth resistor (R7). The collector of the first transistor is connected to a bus line voltage through a fifth resistor (R1).

Optionally, the input signal is a DC (direct current) voltage signal, a PWM (pulse-width modulation) signal, or a combination thereof Optionally, when the input signal is the DC voltage signal, the signal conversion circuit further includes a DC power supply connected to the base of the first transistor. When the input signal is the PWM signal, the signal conversion circuit further includes a PWM signal source and a capacitor. The PWM signal source is connected to a positive electrode of the capacitor and the first resistor (R3) through a sixth resistor (R8). A negative electrode of the capacitor is grounded.

Optionally, the power factor correction circuit further includes an IC (integrated circuit). A CS end of the IC is the current sampling end for receiving the sine-wave voltage signal. The IC further includes a power supply voltage pin and a ground pin. A first terminal (C) of a primary side of the transformer is connected to the bus line voltage, and a second terminal (D) of the primary side of the transformer is connected to the current sampling (CS) base pin of the IC through a seventh resistor (R2) and is grounded through an eighth resistor (R6).

Optionally, the IC further includes a GATE pin used as an output control terminal.

Optionally, the power factor correction circuit further includes a switch tube respectively connected to the second terminal of the primary side of the transformer, the seventh resistor (R2), the GATE pin, and the eighth resistor (R6).

Optionally, the switch tube is a second transistor, a base of the second transistor is connected to the GATE pin, a collector of the second transistor is connected to the second terminal of the primary side of the transformer, and an emitter of the second transistor is connected to between the seventh resistor (R2) and the eighth resistor (R6).

Optionally, the switch tube is a metal oxide semiconductor field effect transistor (MOSFET), and a gate of the MOSFET is connected to the GATE pin, a drain of the MOSFET is connected to the second terminal of the primary side of the transformer, and a source of the MOSFET is connected to between the seventh resistor (R2) and the eighth resistor (R6).

Optionally, the transformer has a secondary side connected to an LED (light-emitting diode) load.

Another aspect or embodiment of the present disclosure provides a dimming system. The dimming system includes a dimming circuit, a power supply, a silicon-controlled rectifier (SCR) dimmer, and an LED load. The power supply has an output connected to the SCR dimmer. The SCR dimmer is connected to the dimming circuit, and the LED load is connected to a secondary side of a transformer in the dimming circuit. The dimming circuit includes a signal conversion circuit and a power factor correction circuit. The signal conversion circuit is configured to convert an input signal into a sine-wave voltage signal and to output the sine-wave voltage signal to a current sampling end of the power factor correction circuit. The power factor correction circuit is configured to receive the sine-wave voltage signal for correcting a power factor.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

The present disclosure provides a dimming circuit and dimming system suitable for SCR dimmer. An exemplary dimmer circuit may include a signal conversion circuit and a power factor correction circuit.

Figure 1:
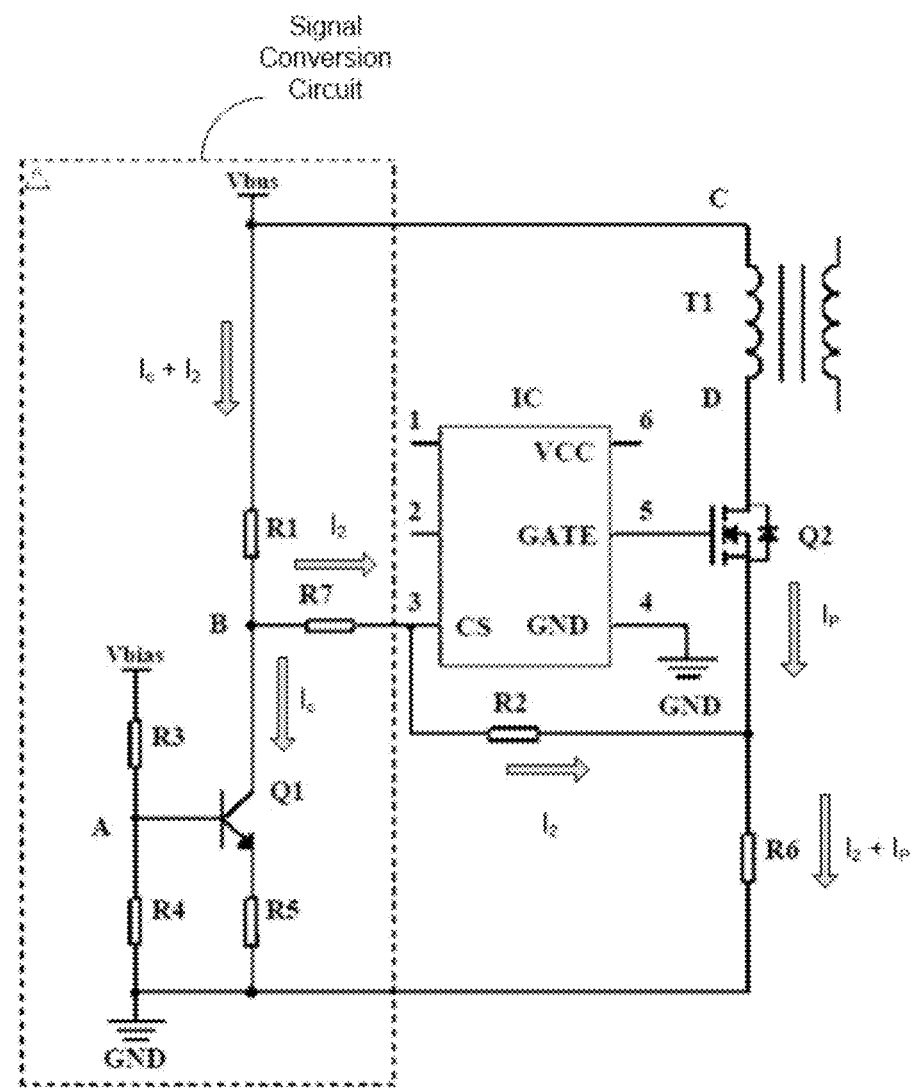
FIG. 1 illustrates an exemplary dimming circuit consistent with the disclosed embodiments in the present disclosure.
Figure 2:
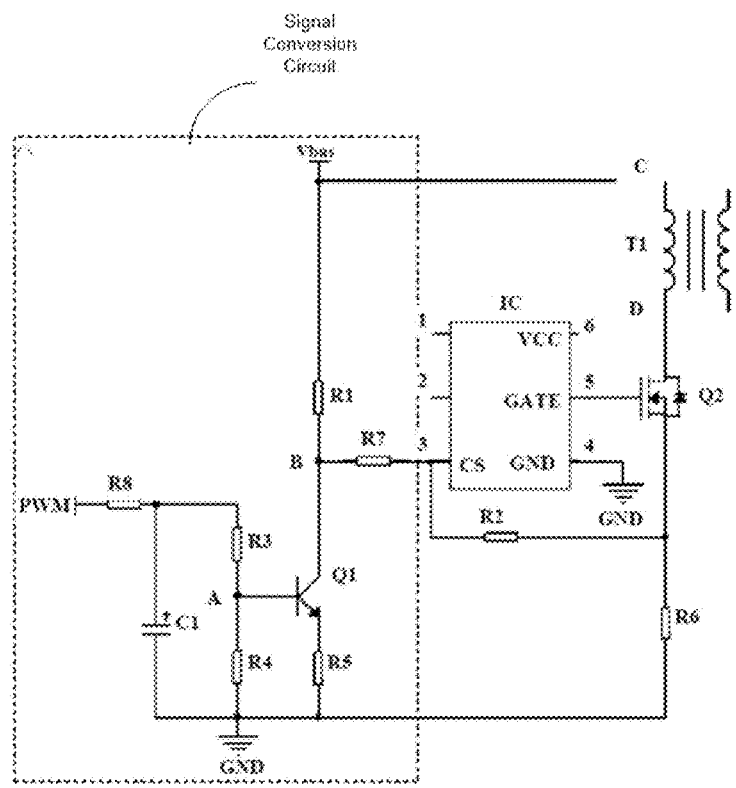
FIG. 2 illustrates another exemplary dimming circuit consistent with the disclosed embodiments in the present disclosure.

The signal conversion circuit, as shown in the dashed boxes in FIG. 1 and FIG. 2, may convert the input signal to a sine-wave voltage signal and output the sine-wave voltage signal to the current sampling (CS) end of the power factor correction circuit.

The power factor correction circuit may receive and sample the sine-wave voltage signal from the current sampling end to correct the power factor. The sine-wave current signal corresponding to the sine-wave voltage signal may be a sum of a biasing current and the primary current of the transformer of the power factor correction circuit.

The biasing current may be controllably generated according to the input signal (e.g., the input signal may control the generation of the biasing current). The value of the biasing current may be positively correlated to the value of the input signal. That is, when the input signal increases, the biasing current increases; and when the input signal decreases, the biasing current decreases.

The input signal may be a DC signal, a PWM (Pulse Width Modulation) signal, or other suitable signals. The signal conversion circuit may convert the input signal to a sine-wave voltage signal. It should be understood that, the signal conversion circuit may include different circuit structures to convert different types of input signals to sine-wave voltage signals. The circuit structure may be any suitable conventional circuit structure to convert the input signal to a sine-wave voltage signal.

The power factor correction circuit may receive the sine-wave voltage signal from the current sampling end to correct the power factor such that the power factor of the sine-wave voltage signal can be increased. It should be noted that, the power factor correction circuit may be any suitable conventional LED driver IC. For example, the power factor correction circuit may be a constant-current LED driver IC with APFC (i.e., active power factor correction). The constant-current LED driver IC with APFC may realize active power factor correction and output constant current to the LED load.

Since the sine-wave current signal corresponding to the sine-wave voltage signal may be a sum of the biasing current and the primary current of the transformer, the biasing current may be generated and controlled by the input signal, and the value of the biasing current may be positively correlated to the value of the input signal, the peak value of the primary current of the transformer can be changed/adjusted by changing/adjusting the value of the input signal. Thus, dimming of the LED can be realized.

In conventional dimming technologies, the voltages superimposed at the current sampling end of a power factor correction circuit often generate a DC biasing voltage. The value of the switch-off threshold of the power factor correction circuit, when the bus line voltage is at wave trough, may often be lower than the DC biasing voltage superimposed at the current sampling end such that the power factor correction circuit may stop functioning when the bus line voltage is a wave trough.

In the present disclosure, the envelope of the sine-wave voltage signal inputted to the current sampling end of the power factor correction circuit may be consistent with the envelope of the bus line voltage. When the bus line voltage is at wave trough, the DC voltage signal at the current sampling end may also become zero. The DC voltage signal may not interfere with the normal operation of the SCR dimmer circuit. The power factor correction circuit may operate smoothly or continuously such that the SCR dimmer can operate normally and stably in all conduction angles. Flashing/strobing of the LED can be prevented, and dimming effect of the LED can be improved.

Embodiments of the present disclosure provide a dimming circuit suitable for SCR dimmer, which is suitable for LED dimming and lighting. In the disclosed dimming circuit, a sine-wave voltage signal may be connected/inputted to the current sampling end of the power factor correction circuit, where the sine-wave voltage may be a sum of a biasing current (e.g., generated according to the input signal) and the primary current of the transformer. The sine-wave voltage signal may be converted from the input signal and the biasing current may be positively correlated to the input signal.

The arrangement described above may ensure that the SCR dimmer can function normally and stably when the disclosed dimming circuit is incorporated in the SCR dimmer. Strobing/flashing of the LED can be prevented or reduced, and dimming effect of the LED can be improved.

FIG. 1 illustrates circuit diagram of an exemplary dimming circuit provided by the present disclosure. As shown in FIG. 1, the input signal may be a DC voltage signal $V_{bias}$. In one embodiment, the signal conversion circuit may include a transistor Q1, and resistors R1, R3, R4, R5, and R7. The base of the transistor Q1 may be connected to the DC voltage signal $V_{bias}$ through resistor R3, and the base of the transistor Q1 may be grounded through resistor R4. The emitter of the transistor Q1 may be grounded through resistor R5, and the collector of the transistor Q1 may be connected to the current sampling end of the power factor correction circuit. The collector of the transistor Q1 may be connected to the bus line voltage through resistor R1.

$V_{bias}$ may be a DC voltage source. In one embodiment, the power factor correction circuit may also include an integrated circuit (IC), where the CS end of the IC denotes the current sampling end. The IC may further include a voltage supply pin (VCC) and a ground pin (GND). One terminal C of the primary side of the transformer may be connected to the bus line voltage $V_{bus}$, and the other terminal D of the primary side of the transistor may be connected to the CS end of the IC through resistor R2. The terminal D may also be grounded through resistor R6.

Specifically, the voltage at point A of FIG. 1 may be described as in equation (1) and the voltage of $V_{bias}$ may be described as in equation (2) as follows.

$$V_a = (1 + \beta) \times ib \times R5 + V_{be} \quad (1)$$

$$Vbias = V_a + \left(\frac{Va}{R4} + ib\right) \times R3 \quad (2)$$

By combining equations (1) and (2), $V_{bias}$ can be expressed in equation (3) and $I_c$ (denoting biasing current, as shown in FIG. 1) can be expressed in equation (4) as follows.

$$V_{bias} = (1 + \beta) \times ib \times R5 \times \left(1 + \frac{R3}{R4}\right) + V_{be} \times \left(1 + \frac{R3}{R4}\right) + ib \times R3 \quad (3)$$

$$I_c \approx (1 + \beta) \times ib = \frac{Vbias - ib \times R3 - Vbe \times \left(1 + \frac{R3}{R4}\right)}{R5 \times \left(1 + \frac{R3}{R4}\right)} \quad (4)$$

β may be the current amplification factor of the transistor, and ib may be the base current of the transistor Q1. $V_{be}$ may be the emitter junction voltage of Q1, and Ic may be the biasing current (i.e., the collector current of Q1).

The value of $$R5 \times \left(1 + \frac{R3}{R4}\right)$$

may be a fixed value. Since $V_{be}$ is correlated with the device properties, the value of $V_{be}$ may also be a fixed value.

It can be known from equation (3) that, since ib may be positively correlated to $V_{bias}$, the value of $(V_{bias}-ib \times R3)$ may be positively correlated to $V_{bias}$. Also, since the sine-wave current signal, corresponding to the sine-wave voltage signal at the CS end of the power factor correction circuit, is a sum of the biasing current $I_c$ and the primary current $I_P$ of the transformer, the biasing current $I_c$ may be positively correlated to the DC voltage signal $V_{bias}$. The biasing current $I_c$ may be controlled by the DC voltage signal $V_{bias}$. By adjusting the amplitude/value of the DC voltage signal $V_{bias}$, the voltage peak value of the primary side of the transformer (T1) can be changed/adjusted. Dimming of the LED light, connected to the secondary side of the transformer, can be realized.

For example, as shown in FIG. 1, $V_{bus}$ (i.e., the bus line voltage) may be an AC (i.e., alternating current) signal with a waveform of sine-wave, and the current flowing through resistor R1 may also have a waveform of a sine-wave. The current flowing through resistor R2 may be $I_2$, and the primary current of the transformer T1, flowing through a switch such as a switch tube Q2, may be $I_P$. The current sampling CS end of the IC often has high impedance and little current is flowing into the IC. Thus the current flowing through resistor R7 may also be $I_2$, the current flowing through resistor R1 may be $(I_c+I_2)$, and the current flowing through resistor R6 may be $(I_P+I_2)$. Therefore, the relationship between $V_{bus}$ and the above resistors/current can be described as in equation (5).

$$V_{bus} = (I_c + I_2) \times R1 + I_2 \times (R2 + R7) + (I_P + I_2) \times R6 \quad (5)$$

The potential at the current sampling end CS may be $V_{CS}$, and $V_{CS}$ may be described in equation (6).

$$V_{CS} = I_2 \times R2 + (I_P + I_2) \times R6 \quad (6)$$

That is, $V_{CS}$ may be the sine-wave voltage signal on the CS end of the IC, and $(I_c+I_2)$ may be the sine-wave current corresponding to the sine-wave voltage signal. The envelope of $V_{CS}$ may be consistent with the envelope of the bus line voltage $V_{bus}$. By changing $V_{bias}$, $I_c$ can be changed according to equation (4). Since the resistances of R1 and R5 are fixed, and the voltage drop on Q1 is also fixed, the sum of $(I_c+I_2)$ may be fixed. That is, when $I_c$ changes, $I_2$ may change accordingly. Since the resistance of R6 is fixed, it can be shown from equation (6) that, when $I_2$ changes, $I_P$ may change accordingly. That is, when $I_2$ increase, $I_P$ decreases, and vice versa. Thus, by changing $V_{bias}$, $I_P$ can be changed, and the current flowing through the LED, at the secondary side of the transformer T1, may be changed. The peak value of $I_P$ can be changed/adjusted. The LED can be dimmed by controlling/varying $V_{bias}$.

Further, the GATE pin of the IC may be an output control pin. Through the switch tube Q2, the power factor correction circuit may further be connected to the other terminal D of the primary side of the transformer T1. Also, the switch tube Q2 may be connected to the CS end of the power factor correction circuit through resistor R2. The switch tube Q2 may be grounded through a resistor R6. The power factor correction circuit may output different voltages to the switch tube Q2 to control the ON/OFF state of the switch tube Q2.

The switch tube Q2 may be a transistor and/or a metal oxide semiconductor field effect transistor (MOSFET). If the switch tube Q2 is a transistor, the base of the transistor may be connected to the output control pin (i.e., GATE pin) of the IC, the collector of the transistor may be connected to the other terminal D of the primary side of the transformer, and the emitter of the transistor may be connected to both resistor R2 and resistor R6 and positioned between resistor R2 and resistor R6. If the switch tube Q2 is a MOSFET, the gate of the MOSFET may be connected to the output control pin (i.e., GATE pin) of the IC, the drain of the MOSFET may be connected to the other terminal D of the primary side of the transformer, and the source of the MOSFET may be connected to both resistor R2 and resistor R6 and positioned between resistor R2 and resistor R6.

As described above, in the dimming circuit provided by the present disclosure, a sine-wave voltage signal may be inputted to the current sampling (CS) end of the IC, and the current corresponding to the sine-wave voltage signal may be a sum of the biasing current and the primary current of the transformer. The generation of the biasing current may be controlled by the DC voltage signal, the sine-wave voltage signal may be converted from the DC voltage signal, and the biasing current may be positively correlated to the DC voltage signal. By using the arrangement/design described above, the dimming circuit, e.g., when used for the SCR dimmer, may ensure the SCR dimmer to operate normally and stably at all conduction angles. Strobing/flashing of LED can be prevented/reduced, and the dimming effect of the LED can be improved.

FIG. 2 illustrates another exemplary circuit diagram of the dimming circuit provided by the present disclosure. As shown in FIG. 2, in one embodiment, the input signal may be a PWM signal. The application of the exemplary circuit shown in FIG. 2 may be different from embodiment illustrated in FIG. 1 (e.g., where the input signal may be a DC voltage signal). For example, the input signal in the embodiment illustrated in FIG. 2 may be a PMW signal such that the dimming circuit may be compatible with applications in PWM dimming.

In one embodiment, when the input signal is a PWM signal, the base of the transistor Q1 may not be connected to a DC voltage signal. Instead, the base of the transistor Q1 may be connected to a PWM signal. The PWM signal source may be connected to resistor R3 and the positive leg of capacitor C1 through resistor R8. The negative electrode of the capacitor C1 may be grounded. The connection arrangement of other components (e.g., resistors, IC, switch, transistors) may be the same as illustrated the embodiment shown in FIG. 1.

The PWM signal may be filtered by resistor R8 and capacitor C1 and a DC voltage may be outputted to resistor R3. The realization of the dimming circuit when the input signal is a PWM signal may be similar to the realization of the dimming circuit when the input signal is a DC signal (as shown in FIG. 1). The working principles and connection arrangement of the dimming circuit when the input signal is a PWM signal may be referred to the aforementioned description of the embodiment illustrated in FIG. 1 and are omitted herein.

In the dimming circuit provided by the present disclosure, a sine-wave voltage signal may be inputted to the current sampling (CS) end of the IC, and the biasing current corresponding to the sine-wave voltage signal may be a sum of the biasing current and the primary current of the transformer. The generation of the biasing current may be controlled by the DC voltage signal, the sine-wave voltage signal may be converted from the DC voltage signal, and the biasing current may be positively correlated to the DC voltage signal, which is obtained by filtering a PWM signal using a capacitor and a resistor. By using the arrangement/design described above, the dimming circuit, e.g., when used for the SCR dimmer, may ensure the SCR dimmer to operate stably at all conduction angles. Strobing/flashing of LED can be prevented/reduced, and dimming effect of the LED can be improved.

Figure 3:
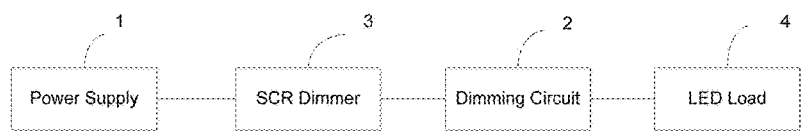
FIG. 3 illustrates an exemplary dimming system consistent with the disclosed embodiments in the present disclosure.

FIG. 3 illustrates structure of an exemplary dimming system provided by the present disclosure. As shown in FIG. 3, the dimming system may include the disclosed dimming circuit 2, power supply 1, SCR dimmer 3, and LED load 4.

The output terminal of the power supply 1 may be connected to the SCR dimmer 3, the SCR dimmer 3 may be connected to the disclosed dimming circuit 2, and the secondary side of the transformer in the dimming circuit may be connected to the LED load 4.

The power supply 1 may be an external power supply or may be integrated with/into the SCR dimmer 3, the dimming circuit 2, and/or the LED load. The dimming circuit may be either one of the dimming circuits in FIGS. 1-2. The LED load may be a single LED or a plurality of LEDs. The SCR dimmer 3 and/or the dimming circuit 2 may be integrated with/into the LED load or separated from the LED load. The dimming circuit 2 may be integrated in the SCR dimmer 3 or separated from the SCR dimmer 3. The input signal (e.g., DC or PWM) may be provided by the SCR dimmer or an external signal source.

In the dimming circuit provided by the present disclosure, a sine-wave voltage signal may be inputted to the current sampling (CS) end of the IC, and the sine-wave current signal corresponding to the sine-wave voltage signal may be the sum of the biasing current and the primary current of the transformer. The generation of the biasing current may be controlled by the input voltage signal such as a DC voltage signal, and the sine-wave voltage signal may be converted from the input voltage signal. The biasing current may be positively correlated to the DC voltage signal. By controlling the input voltage signal, the power factor correction circuit may work continuously, the peak value of the primary current of the transformer can be controlled, and the dimming of the LED load on the secondary side of the transformer can be realized. By using the arrangement/design described above, the dimming circuit, e.g., when used for the SCR dimmer, may ensure the SCR dimmer to operate normally and stably at all conduction angles. Strobing/flashing of LED can be prevented/reduced, and dimming effect of the LED can be improved.

The embodiments disclosed herein are exemplary only. Other applications, advantages, alternations, modifications, or equivalents to the disclosed embodiments are obvious to those skilled in the art and are intended to be encompassed within the scope of the present disclosure.

REFERENCE SIGN LIST

Power supply 1
Dimming circuit 2
SCR dimmer 3
LED load 4

What is claimed is:

1. A dimming circuit for a silicon-controlled rectifier (SCR) dimmer, comprising:
 a signal conversion circuit and a power factor correction circuit, wherein:
 the signal conversion circuit is configured to convert an input signal into a sine-wave voltage signal and to output the sine-wave voltage signal to a current sampling end of the power factor correction circuit,
 the power factor correction circuit is configured to receive the sine-wave voltage signal for correcting a power factor, a biasing current is controllably generated according to the input signal and is positively correlated to a value of the input signal, and a sine-wave current signal corresponding to the sine-wave voltage signal is a sum of the biasing current and a primary current of a transformer in the power factor correction circuit.

2. The dimming circuit according to claim 1, wherein the signal conversion circuit comprises a first transistor, wherein:

a base of the first transistor is connected to the input signal through a first resistor and the base of the first transistor is grounded through a second resistor, an emitter of the first transistor is grounded through a third resistor, and a collector of the first transistor is connected to the current sampling end of the power factor correction circuit through a fourth resistor, and the collector of the first transistor is connected to a bus line voltage through a fifth resistor.

3. The dimming circuit according to claim 2, wherein the input signal is a DC (direct current) voltage signal, a PWM (pulse-width modulation) signal, or a combination thereof.

4. The dimming circuit according to claim 3, wherein:

when the input signal is the DC voltage signal, the signal conversion circuit further comprises a DC power supply connected to the base of the first transistor, and when the input signal is the PWM signal, the signal conversion circuit further comprises a PWM signal source and a capacitor, wherein the PWM signal source is connected to a positive electrode of the capacitor and the first resistor through a sixth resistor, and a negative electrode of the capacitor is grounded.

5. The dimming circuit according to claim 2, wherein the power factor correction circuit further comprises an IC (integrated circuit), wherein:

a CS end of the IC is the current sampling end for receiving the sine-wave voltage signal, the IC further comprises a power supply voltage pin and a ground pin, and a first terminal of a primary side of the transformer is connected to the bus line voltage, and a second terminal of the primary side of the transformer is connected to the current sampling (CS) base pin of the IC through a seventh resistor and is grounded through an eighth resistor.

6. The dimming circuit according to claim 5, wherein the IC further comprises a GATE pin used as an output control terminal.

7. The dimming circuit according to claim 6, wherein the power factor correction circuit further comprises a switch tube respectively connected to the second terminal of the primary side of the transformer, the seventh resistor, the GATE pin, and the eighth resistor.

8. The dimming circuit according to claim 7, wherein:

the switch tube is a second transistor, a base of the second transistor is connected to the GATE pin, a collector of the second transistor is connected to the second terminal of the primary side of the transformer, and an emitter of the second transistor is connected to between the seventh resistor and the eighth resistor.

9. The dimming circuit according to claim 7, wherein:

the switch tube is a metal oxide semiconductor field effect transistor (MOSFET), and a gate of the MOSFET is connected to the GATE pin, a drain of the MOSFET is connected to the second terminal of the primary side of the transformer, and a source of the MOSFET is connected to between the seventh resistor and the eighth resistor.

10. The dimming circuit according to claim 1, wherein:

the transformer has a secondary side connected to an LED (light-emitting diode) load.

11. A dimming system, comprising:

a dimming circuit, a power supply, a silicon-controlled rectifier (SCR) dimmer, and an LED load, wherein:

the power supply has an output connected to the SCR dimmer, the SCR dimmer is connected to the dimming circuit, and the LED load is connected to a secondary side of a transformer in the dimming circuit, the dimming circuit comprises a signal conversion circuit and a power factor correction circuit, wherein:

the signal conversion circuit is configured to convert an input signal into a sine-wave voltage signal and to output the sine-wave voltage signal to a current sampling end of the power factor correction circuit, the power factor correction circuit is configured to receive the sine-wave voltage signal for correcting a power factor, a biasing current is controllably generated according to the input signal and is positively correlated to a value of the input signal, and a sine-wave current signal corresponding to the sine-wave voltage signal is a sum of the biasing current and a primary current of a transformer in the power factor correction circuit.

* * * * *